US012289803B2

(12) United States Patent
Silvestrini et al.

(10) Patent No.: US 12,289,803 B2
(45) Date of Patent: Apr. 29, 2025

(54) METHOD OF CONFIGURING FLUID PERMEABLE HEATER

(71) Applicant: Altria Client Services LLC, Richmond, VA (US)

(72) Inventors: Patrick Charles Silvestrini, Neuchatel (CH); Ihar Nikolaevich Zinovik, Peseux (CH); Guillaume Frederick, Les-Geneveys-sur-Coffrane (CH)

(73) Assignee: Altria Client Services LLC, Richmond, VA (US)

( * ) Notice: Subject to any disclaimer, the term of this patent is extended or adjusted under 35 U.S.C. 154(b) by 78 days.

(21) Appl. No.: 18/166,761

(22) Filed: Feb. 9, 2023

(65) Prior Publication Data

US 2023/0189399 A1 Jun. 15, 2023

Related U.S. Application Data

(60) Division of application No. 15/903,659, filed on Feb. 23, 2018, now Pat. No. 11,653,419, which is a (Continued)

(30) Foreign Application Priority Data

Feb. 24, 2017 (EP) .................................... 17157957

(51) Int. Cl.
*A24F 40/46* (2020.01)
*A24B 15/167* (2020.01)
(Continued)

(52) U.S. Cl.
CPC ......... *H05B 1/0227* (2013.01); *A24B 15/167* (2016.11); *A24F 40/42* (2020.01);
(Continued)

(58) Field of Classification Search
CPC ........... A24F 40/10; A24F 40/42; A24F 40/46
See application file for complete search history.

(56) References Cited

U.S. PATENT DOCUMENTS 5,167,242 A 12/1992 Turner et al.
6,790,496 B1 9/2004 Levander et al.
(Continued)

FOREIGN PATENT DOCUMENTS

AR 099324 A1 7/2016
CN 103462224 A 12/2013
(Continued)

OTHER PUBLICATIONS

Notice of Acceptance dated Mar. 27, 2023, issued in corresponding Australian Application No. 2018226112.
(Continued)

*Primary Examiner* — Russell E Sparks
(74) *Attorney, Agent, or Firm* — Harness, Dickey & Pierce, P.L.C.

(57) ABSTRACT

The method includes first defining a reservoir within at least one first housing, the reservoir having a first part and a second part and being configured to contain a pre-vapor formulation, second defining at least one channel that is configured to communicate the pre-vapor formulation from the first part to the second part, third defining an airflow path within the at least one first housing, and first configuring a heater that is fluid permeable to heat and at least partially vaporize the pre-vapor formulation, the heater being on an end of the second part, the heater having a first surface that faces the first part, a first portion of the first surface being in direct communication with a second portion of the airflow path.

20 Claims, 8 Drawing Sheets

Related U.S. Application Data continuation of application No. PCT/EP2018/053579, filed on Feb. 13, 2018.

(51) Int. Cl.

| | |
|---|---|
| ***A24F 40/10*** | (2020.01) |
| ***A24F 40/42*** | (2020.01) |
| ***A24F 40/485*** | (2020.01) |
| ***A24F 40/50*** | (2020.01) |
| ***B65D 85/72*** | (2006.01) |
| ***H05B 1/02*** | (2006.01) |
| ***H05B 3/34*** | (2006.01) |

(52) U.S. Cl.

CPC ............ *A24F 40/46* (2020.01); *A24F 40/485* (2020.01); *A24F 40/50* (2020.01); *B65D 85/72* (2013.01); *H05B 3/34* (2013.01); *A24F 40/10* (2020.01)

(56) References Cited

U.S. PATENT DOCUMENTS

| | | | |
|---|---|---|---|
| 8,991,402 | B2 | 3/2015 | Bowen et al. |
| 9,351,522 | B2 | 5/2016 | Safari |
| 9,420,831 | B2 | 8/2016 | Liu |
| 9,439,455 | B2 | 9/2016 | Alarcon et al. |
| 9,936,731 | B2 | 4/2018 | Hopps |
| 9,943,114 | B2 | 4/2018 | Batista |
| 9,986,765 | B2 | 6/2018 | Batista |
| 10,080,387 | B2 | 9/2018 | Phillips et al. |
| 10,149,497 | B2 | 12/2018 | Memari et al. |
| 10,149,498 | B2 | 12/2018 | Batista et al. |
| 10,159,284 | B2 | 12/2018 | Dickens |
| 10,231,486 | B2 | 3/2019 | Bowen et al. |
| 10,602,780 | B2 | 3/2020 | Chen |
| 10,687,552 | B2 | 6/2020 | Zinovik et al. |
| 10,869,505 | B2 | 12/2020 | Borkovec et al. |
| 10,905,161 | B2 | 2/2021 | Chen |
| 11,134,716 | B2 | 10/2021 | Dick et al. |
| 2011/0226236 | A1 | 9/2011 | Buchberger |
| 2013/0074857 | A1 | 3/2013 | Buchberger |
| 2013/0192623 | A1 | 8/2013 | Tucker et al. |
| 2013/0228191 | A1 | 9/2013 | Newton |
| 2013/0319407 | A1 | 12/2013 | Liu |
| 2013/0327327 | A1 | 12/2013 | Edwards et al. |
| 2014/0000638 | A1 | 1/2014 | Sebastian et al. |
| 2015/0040929 | A1 | 2/2015 | Hon |
| 2015/0090279 | A1 | 4/2015 | Chen |
| 2015/0163859 | A1 | 6/2015 | Schneider et al. |
| 2015/0181943 | A1 | 7/2015 | Li et al. |
| 2015/0272217 | A1 | 10/2015 | Chen |
| 2016/0007654 | A1 | 1/2016 | Zhu |
| 2016/0073692 | A1 | 3/2016 | Alarcon et al. |
| 2016/0128386 | A1 | 5/2016 | Chen |
| 2016/0138795 | A1 | 5/2016 | Meinhart et al. |
| 2016/0262454 | A1 | 9/2016 | Sears et al. |
| 2016/0338410 | A1 | 11/2016 | Batista et al. |
| 2016/0345630 | A1 | 12/2016 | Mironov et al. |
| 2016/0374399 | A1 | 12/2016 | Monsees et al. |
| 2017/0027226 | A1 | 2/2017 | Mironov et al. |
| 2017/0181472 | A1 | 6/2017 | Batista et al. |
| 2017/0251718 | A1 | 9/2017 | Armoush et al. |
| 2017/0340014 | A1 | 11/2017 | Batista et al. |
| 2018/0279679 | A1 | 10/2018 | McAdam et al. |
| 2019/0045837 | A1 | 2/2019 | Spencer |
| 2019/0335819 | A1 | 11/2019 | Watanabe |

FOREIGN PATENT DOCUMENTS

| | | | |
|---|---|---|---|
| CN | 203341007 | U | 12/2013 |
| CN | 203341008 | U | 12/2013 |
| CN | 103932401 | A | 7/2014 |
| CN | 203969207 | U | 12/2014 |
| CN | 104540406 | A | 4/2015 |
| CN | 204617067 | U | 9/2015 |
| CN | 105559151 | A | 5/2016 |
| CN | 105722416 | A | 6/2016 |
| CN | 105876873 | A | 8/2016 |
| CN | 205512340 | U | 8/2016 |
| CN | 105939625 | A | 9/2016 |
| CN | 106455713 | A | 2/2017 |
| CN | 206197017 | U | 5/2017 |
| CN | 106998813 | A | 8/2017 |
| CN | 106998816 | A | 8/2017 |
| CN | 107105776 | A | 8/2017 |
| CN | 108289505 | A | 7/2018 |
| DE | 102014114133 | A1 | 3/2016 |
| DE | 202016100917 | U1 | 3/2016 |
| EP | 2460424 | A1 | 6/2012 |
| EP | 2888963 | A1 | 7/2015 |
| EP | 3053459 | A2 | 8/2016 |
| EP | 3158882 | A2 | 4/2017 |
| EP | 3684203 | B1 | 2/2023 |
| JP | 2014/511175 | A | 5/2014 |
| JP | 5815559 | B2 | 11/2015 |
| JP | 2017-506076 | A | 3/2017 |
| JP | 2017/519492 | A | 7/2017 |
| JP | 2017/522021 | A | 8/2017 |
| JP | 2017/522872 | A | 8/2017 |
| JP | 2018-504132 | A | 2/2018 |
| KR | 20160102293 | A | 8/2016 |
| KR | 2016/0119773 | A | 10/2016 |
| KR | 20160119777 | A | 10/2016 |
| RU | 2489948 | C2 | 8/2013 |
| RU | 2597531 | C2 | 9/2016 |
| RU | 2608289 | C2 | 1/2017 |
| RU | 2657215 | C2 | 6/2018 |
| TW | 201534229 | A | 9/2015 |
| TW | 201620405 | A | 6/2016 |
| UA | 67598 | U | 2/2012 |
| UA | 116828 | C2 | 5/2018 |
| WO | WO-2014/102092 | A1 | 7/2014 |
| WO | WO-2014/110119 | A1 | 7/2014 |
| WO | WO-2015/043132 | A1 | 4/2015 |
| WO | WO-2015/100361 | A1 | 7/2015 |
| WO | WO-2015/114325 | A1 | 8/2015 |
| WO | WO-2015/117700 | A1 | 8/2015 |
| WO | WO-2015/117702 | A1 | 8/2015 |
| WO | WO-2015/117704 | A1 | 8/2015 |
| WO | WO-2015/117705 | A2 | 8/2015 |
| WO | WO-2015/179292 | A1 | 11/2015 |
| WO | WO-2015/189623 | A1 | 12/2015 |
| WO | WO-2016/005530 | A1 | 1/2016 |
| WO | WO-2016/041206 | A1 | 3/2016 |
| WO | WO-2016/075748 | A1 | 5/2016 |
| WO | WO-2016/092261 | A1 | 6/2016 |
| WO | WO-2016/096497 | A1 | 6/2016 |
| WO | WO-2016/096728 | A1 | 6/2016 |
| WO | WO-2016/101141 | A1 | 6/2016 |
| WO | WO-2016/145612 | A1 | 9/2016 |
| WO | WO-2016/156103 | A1 | 10/2016 |
| WO | WO-2016/0156413 | A1 | 10/2016 |
| WO | WO-2016/172023 | A1 | 10/2016 |
| WO | WO-2016/172448 | A1 | 10/2016 |
| WO | WO-2016/198417 | A1 | 12/2016 |
| WO | WO-2017/019402 | A2 | 2/2017 |
| WO | WO-2017/042081 | A1 | 3/2017 |
| WO | WO-2017/064051 | A1 | 4/2017 |
| WO | WO-2018/153608 | A1 | 8/2018 |
| WO | WO-2018/153732 | A1 | 8/2018 |

OTHER PUBLICATIONS

Office Action dated May 2, 2023 issued in corresponding Ukrainian Patent Application No. a 2020 01404.

Notice of Allowance for Korean Application No. 10-2019-7022821 dated Jun. 16, 2023.

Final Office Action, dated Mar. 26, 2024, issued in U.S. Appl. No. 16/184,322.

Advisory Action dated Jul. 6, 2023, issued in corresponding U.S. Appl. No. 16/184,322.

(56) References Cited

OTHER PUBLICATIONS

Mexican Office Action, dated Feb. 22, 2024, issued in Mexican Patent Application No. MX/a/2020/002695.
Brazilian Office Action, dated Dec. 4, 2023, issued in Brazilian Patent Application No. BR112019014300-9.
Notice of Opposition dated Jul. 17, 2023, issued in corresponding European Patent Application No. 18705140.4 / Patent No. 3585190.
Notice of Allowance dated Aug. 14, 2023, issued in corresponding Korean Patent Application No. 10-2019-7020165.
Brazilian Office Action, dated Apr. 2, 2024, issued in Brazilian Patent Application No. BR112019014300-9.
Philippines Office Action, dated May 15, 2024, issued in Philippines Patent Application No. 1-2019-501493.
Philippines Office Action, dated May 15, 2024, issued in Philippines Patent Application No. 1-2019-501531.
Canadian Office Action, dated May 21, 2024, issued in Canadian Patent Applicaiton No. 3,047,676.
Malaysian Office Action, dated Jan. 24, 2024, issued in Malaysian Patent Application No. PI2020000389.
Mexican Notice of Allowance, dated Jan. 23, 2024, issued in Mexican Patent Application No. MX/a/2019/009433.
European Notice of Allowance, dated Feb. 1, 2024, issued in European Patent Application No. 22215573.1.
Indian Office Action, dated Jan. 29, 2024, issued in Indian Patent Application No. 201917029535.
Japanese Notice of Allowance, dated Feb. 8, 2024, issued in Japanese Patent Application No. 2023-001599.
Malaysian Notice of Allowance, dated Feb. 9, 2024, issued in Malaysian Patent Application No. PI2019004849.
Office Action dated Feb. 15, 2023 issued in corresponding Korean Patent Application No. 10-2019-7020165.
Office Action dated Mar. 13, 2023, issued in corresponding U.S. Appl. No. 16/184,322.
Office Action dated Feb. 23, 2023 issued in corresponding Chinese Patent Application No. 201880055055.9.
Notice of Allowance dated Jan. 30, 2023 issued in corresponding Israeli Patent Application No. 272286.
Notice of Allowance dated Mar. 6, 2023 issued in corresponding Japanese Patent Application No. 2020-515922.
Office Action dated Jul. 12, 2023 issued in corresponding Ukrainian Patent Application No. a 2020 01404.
Brazilian Office Action, dated Aug. 1, 2023, issued in corresponding Brazilian Patent Application No. BR112019014300-9.
Malaysian Office Action, dated Aug. 30, 2023, issued in corresponding Malaysian Patent Application No. PI2019004849.
Final Office Action, dated Jun. 4, 2024, issued in U.S. Appl. No. 18/182,466.
Canadian Office Action, dated May 24, 2024, issued in Canadian Patent Application No. 3,049,937.
Extended European Search Report No. 17157957.6 dated Dec. 20, 2017.
Extended European Search Report No. 17157960.0 dated Sep. 21, 2017.
International Search Report and Written Opinion issued Apr. 19, 2018 in related PCT Application No. PCT/EP2018/053579.
International Search Report and Written Opinion issued May 2, 2018 in related PCT Application No. PCT/EP2018/051730.
International Preliminary Report on Patentability dated Sep. 6, 2019, issued in corresponding International Application No. PCT/EP2018/053579.
Office Action dated Jul. 21, 2020, issued in corresponding U.S. Appl. No. 15/903,612.
Office Action dated Nov. 10, 2020, issued in corresponding U.S. Appl. No. 15/903,612.
Office Action dated Mar. 22, 2021, issued in corresponding Taiwanese Patent Application No. 107105796.
Office Action dated Jun. 8, 2021, issued in corresponding Indian Patent Application No. 201917029535.
Office Action dated May 17, 2021, issued in corresponding Indonesian Patent Application No. PID201907026.
Office Action dated May 25, 2021, issued in corresponding Taiwanese Patent Application No. 107105602.
Office Action dated Jun. 24, 2021, issued in corresponding U.S. Appl. No. 15/903,612.
Machine translation of TW201534229A (translation date: Jun. 16, 2021).
Russian Decision to Grant and Search Report dated May 26, 2021, issued in corresponding Russian Patent Application No. 2019126654.
Russian Decision to Grant and Search Report dated Jul. 5, 2021, issued in corresponding Russian Patent Application No. 2019129609.
Examination Report dated Jul. 8, 2021, issued in corresponding Indian Application No. 201917025257.
Allowance Decision dated Jul. 29, 2021, issued in corresponding Taiwanese Application No. 107105796.
Ukrainian Decision to Grant dated Aug. 17, 2021, issued in corresponding Ukrainian Patent Application No. a201907116.
Singapore Decision to Grant dated Sep. 29, 2021, issued in corresponding Singapore Patent Application No. 11201907696Q.
Allowance Decision dated Nov. 18, 2021, issued in corresponding Taiwanese Application No. 107105602.
Allowance decision dated Oct. 22, 2021, issued in corresponding Indonesian Patent Application No. PID201907026.
Office Action dated Nov. 1, 2021, issued in corresponding Chinese Patent Application No. 201880009372.7.
Office Action dated Jan. 3, 2022, issued in corresponding U.S. Appl. No. 15/903,612.
Office Action dated Dec. 3, 2021 issued in corresponding Chinese Patent Application No. 201880009641.
Office Action dated Dec. 7, 2021 issued in corresponding Argentine Patent Application No. 20180100438.
Appeal Notice dated Nov. 30, 2021, issued in corresponding Russian Patent No. RU-2,754,483-C2.
Standard GOST 2715-75.
International Standard GOST 25346-2013 (ISO 286-1:2010).
Standard GOST 3.1109-82.
Physical Encyclopedia, ed. A.M. Prokhorov, vol. 1, 1994, pp. 119, 614-615.
Gavrilov N.V., Kamenetsky A.S., ZhTF, 2007, vol. 77, issue 3, pp. 12-16.
Notice of Allowance dated Apr. 7, 2022, issued in corresponding U.S. Appl. No. 15/903,659.
Getmanov V.N. PMTF, 1991, No. 1, p. 3-8.
Office Action dated Feb. 21, 2022 issued in corresponding Japanese Patent Application No. 2019-546182.
Notice of Allowance dated May 3, 2022, issued in corresponding European Patent Application No. 18 705 140.4.
Notice of Allowance dated Mar. 24, 2022, issued in corresponding Israeli Patent Application No. 268334.
Notice of Deficiencies dated Mar. 20, 2022, issued in corresponding Israeli Patent Application No. 268332.
Office Action dated Feb. 28, 2022 issued in corresponding Japanese Patent Application No. 2019-545349.
Office Action dated May 16, 2022, issued in corresponding Chinese Patent Application No. 201880009372.7.
Decision to Grant dated Jul. 4, 2022 issued in corresponding Japanese Patent Application No. 2019-545349.
Notice of Allowance dated Jul. 22, 2022 issued in corresponding Chinese Patent Application No. 201880009641.
Notice of Allowance dated Jul. 29, 2022, issued in corresponding U.S. Appl. No. 15/903,612.
International Search Report and Written Opinion for corresponding European Application No. PCT/EP2018/071551 dated Oct. 29, 2018.
International Preliminary Report on Patentability issued Apr. 2, 2020 in International Application No. PCT/EP2018/071551.
Official Notification dated Nov. 11, 2021, issued in corresponding Russian Patent Application No. 2020113626/03.
Russian Office Action and Search Report dated Apr. 8, 2022, issued in corresponding Russian Patent Application No. 2020113626.
Office Action dated Nov. 24, 2021, issued in corresponding U.S. Appl. No. 16/184,322.
Office Action dated Jun. 10, 2022, issued in corresponding U.S. Appl. No. 16/184,322.

(56) References Cited

OTHER PUBLICATIONS

Russian Decision to Grant dated Jul. 6, 2022, issued in corresponding Russian Patent Application No. 2022103042.
Office Action dated Aug. 2, 2022, issued in corresponding Brazilian Patent Application No. 1120190149759.
Additional Arguments for Appeal dated Feb. 10, 2022, issued in corresponding Russian Patent No. RU-2,754,483-C2.
Annex to Additional Arguments for Appeal dated Mar. 4, 2022, issued in corresponding Russian Patent No. RU-2,754,483-C2.
Chemical Resistance Chart by Burkert, 2018 https://vvww.burkert.com/en/content/download/9318/334992/iile/Chemical-Resistance-Chart.pdf?id=48.
Chemical Compatibility Chart by IDEX, 2022, https://www.idex-hs.com/literature-tools/educational-materials/chemical-compatibility/.
Aditya Ramgobin et al., 'A Case Study of Polyether Ether Ketone (I): Investigating the Thermal and Fire Behavior of a High-Performance Material' Polymers, vol. 12, No. 1789, Aug. 2020.
Chemical Compatibility Table by Colder, Aug. 2011, https://www.usplastic.com/catalog/files/charts/Colder%20CC.pdf.
Chemical Compatibility Table by Colder, Jan. 2010, https://www.tom-parker.co.uk/upload/files/literature/CPC_Chemical_Compatibility_Chart_(261KB).pdf.
Excerpt from Peek polymer chemical compatibility table by polymer manufacturer Victrex: Chemical Resistance; Victrex Peek Polymers, 2016, https://www.victrex.com/en/technical-guides.
Excerpt from technical guides in respect of Peek polymer properties by polymer manufacturer Victrex: Safety Data Sheet, Nov. 2021, https://www.victrex.com/en/technical-guides.
Excerpt from Material Safety Data Sheet for Peek polymer by polymer manufacturer Victrex: Technical Guide, 2016, https://www.victrex.com/en/msds.
Michael O'Conner, 'Philip Morris delayed e-vapor launch as vaping fears spread' S&P Global, Feb. 2020, https://www.spglobal.com/marketintelligence/en/news-insights/latest-news-headlines/philip-morris-delayed-e-vapor-launch-as-vaping-fears-spread-56987277.
Ukrainian Decision to Grant dated Aug. 9, 2022, issued in corresponding Ukrainian Patent Application No. a 2019 07117.
Notice of Allowance dated Aug. 30, 2022, issued in corresponding U.S. Appl. No. 15/903,612.
Notice of Allowance dated Jul. 25, 2022, issued in corresponding Israeli Patent Application No. 268332.
Office Action dated Sep. 6, 2022, issued in corresponding Brazilian Patent Application No. 1120190143009.
Office Action dated Jul. 21, 2022, issued in corresponding Brazilian Patent Application No. 112020003506-8.
Russian Decision to Grant dated Jul. 6, 2022, issued in corresponding Russian Patent Application No. 2020113626.
Office Action dated Sep. 7, 2022, issued in corresponding Israeli Patent Application No. 272286.
Office Action dated Oct. 26, 2022, issued in corresponding U.S. Appl. No. 16/184,322.
Notice of Allowance dated Oct. 21, 2022 issued in corresponding Chinese Patent Application No. 201880009372.7.
Search Report dated Oct. 25, 2022, issued in corresponding Malaysian Patent Application No. PI2019003605.
Notice of Allowance dated Nov. 22, 2022, issued in corresponding U.S. Appl. No. 15/903,612.
Decision of Grant issued on Nov. 16, 2022 in corresponding to Japanese Application No. 2019-546182.
Examination Report dated Nov. 17, 2022, issued in corresponding Australian Application No. 2018224736.
Examination Report dated Nov. 21, 2022, issued in corresponding Australian Application No. 2018226112.
Examination Report dated Nov. 10, 2022, issued in corresponding Malaysian Patent Application No. PI2019004849.
Office Action issued on Oct. 11, 2022 in corresponding Japanese Application No. 2020-515922.
Office Action dated Dec. 13, 2022 issued in corresponding Korean Patent Application No. 10-2019-7022821.
European Notice of Opposition, dated Nov. 7, 2023, issued in related European Patent Application No. 18752151.3.
Indian Office Action, dated Nov. 9, 2023, issued in corresponding Indian Patent Application No. 201917025257.
Philippines Office Action, dated Nov. 15, 2024, issued in Philippines Patent Application No. 1-2020-500083.
European Opposition Letter, dated Sep. 12, 2024, issued in European Patent Application No. 18705140.4.
Philippines Office Action, dated Sep. 6, 2024, issued in Philippines Patent Application No. 1-2019-501531.
Brazilian Office Action, dated Sep. 3, 2024, issued in Brazilian Patent Application No. 1120190143009.
Philippines Office Action, dated Sep. 6, 2024, issued in Philippines Patent Application No. 1-2019-501493.
Extended European Search Report, dated Nov. 4, 2024, issued in European Patent Application No. 24179275.3.
European Decision Rejecting the Opposition, dated Dec. 6, 2024, issued in European Patent Application No. 18705140.4.
Notice of Allowance, dated Dec. 27, 2024, issued in U.S. Appl. No. 16/184,322.
Notice of Allowance issued Jan. 16, 2025 in U.S. Appl. No. 18/182,466.
Philippines Office Action issued Jan. 31, 2025 in Philippines Patent Application No. 1-2020-500083.

METHOD OF CONFIGURING FLUID PERMEABLE HEATER

CROSS-REFERENCE TO RELATED APPLICATIONS

This application is a divisional of U.S. application Ser. No. 15/903,659, filed Feb. 23, 2018, which is a continuation of, and claims priority to, international application number PCT/EP2018/053579, filed on Feb. 13, 2018, and further claims priority under 35 USC § 119 to European patent application number 17157957.6, filed on Feb. 24, 2017, the entire contents of each of which are incorporated herein by reference.

FIELD

Example embodiments relate to an aerosol-generating system and in particular to a mounting arrangement for an aerosol-generating element in an aerosol-generating system.

DESCRIPTION OF RELATED ART

In handheld aerosol-generating systems that generate an aerosol from a liquid aerosol-forming substrate there can be some means of transporting the liquid to the vicinity of an electrically operated vaporizer, such as a heating element, in order to replenish liquid that has been vaporized by the vaporizer. Power can be supplied to the vaporizer through electrical contacts connected to the vaporizer.

SUMMARY

At least one example embodiment relates to a cartridge for an aerosol-generating system.

In one embodiment, the cartridge includes a housing defining an air inlet and an air outlet; an airflow path defined within the housing, the airflow path extending from the air inlet to the air outlet; an atomizer assembly including, an aerosol-generating element that is fluid permeable, and two electrical contact portions connected to the aerosol-generating element, the aerosol-generating element having a first side and a second side opposite the first side, wherein the first side of the aerosol-generating element is exposed to the airflow path and the second side of the aerosol-generating element is in contact with a liquid; and an atomizer mount containing the atomizer assembly, the atomizer mount covering a first portion of the first side of the aerosol-generating element to isolate the electrical contact portions from the airflow path, the atomizer mount covering at least a portion of the second side of the aerosol-generating element to isolate the electrical contact portions from the liquid.

In one embodiment, the aerosol-generating element defines a fluid passage that is at least one of a plurality of interstices and apertures, the fluid passage extending from the second side to the first side of the aerosol-generating element.

In one embodiment, the aerosol-generating element is a heating element.

In one embodiment, the heating element includes a plurality of electrically conductive filaments forming at least one of a mesh and a perforated plate.

In one embodiment, the aerosol-generating element is planar.

In one embodiment, the electrical contact portions are positioned on opposite ends of the heating element.

In one embodiment, the cartridge further includes a liquid storage compartment having a first portion and a second portion, wherein the atomizer mount includes at least one wall defining the second portion of the liquid storage compartment, the wall extending from the second side of the aerosol-generating element.

In one embodiment, the first portion of the liquid storage compartment is on an opposite side of the atomizer assembly from the second portion of the liquid storage compartment.

In one embodiment, the atomizer mount defines an enclosed liquid flow path from a first side of the atomizer assembly to a second side of the atomizer assembly.

In one embodiment, the cartridge further includes a capillary material in contact with the second side of the aerosol-generating element.

In one embodiment, the cartridge has a mouth end and a connection end configured to connect to a control body of the aerosol-generating system, wherein the first side of the aerosol-generating element faces the mouth end and the second side of the aerosol-generating element faces the connection end.

In one embodiment, the atomizer mount is formed from a molded polymeric material that is molded around the atomizer assembly.

In one embodiment, the atomizer mount covers the electrical contact portions on the first side of the atomizer assembly.

At least another example embodiment relates to an aerosol-generating system.

In one embodiment, the system includes a cartridge, the cartridge including, a housing defining an air inlet and an air outlet, an airflow path defined within the housing, the airflow path extending from the air inlet to the air outlet, an atomizer assembly including, an aerosol-generating element that is fluid permeable, and two electrical contact portions connected to the aerosol-generating element, the aerosol-generating element having a first side and a second side opposite the first side, wherein the first side of the aerosol-generating element is exposed to the airflow path and the second side of the aerosol-generating element is in contact with a liquid, and an atomizer mount containing the atomizer assembly, the atomizer mount covering a first portion of the first side of the aerosol-generating element to isolate the electrical contact portions from the airflow path, the atomizer mount covering at least a portion of the second side of the aerosol-generating element to isolate the electrical contact portions from the liquid; and a control body connected to the cartridge, the control body configured to control a supply of electrical power to the aerosol-generating element.

At least another example embodiment relates to an aerosol-generating system, including a housing defining an air inlet and air outlet; an airflow path defined between the air inlet to the air outlet; an atomizer assembly including, an aerosol-generating element that is fluid permeable, and two electrical contact portions connected to the aerosol-generating element, the atomizer assembly having a first side and a second side opposite the first side, wherein a first side of the aerosol-generating element is exposed to the airflow path and a second side of the aerosol-generating element is in contact with a liquid; an atomizer mount containing the atomizer assembly, the atomizer mount covering a portion of the first side of the atomizer assembly to isolate the electrical contact portions from the airflow path and covering at least a portion of the second side of the atomizer assembly to isolate the electrical contact portions from the liquid; a power supply connected to the electrical contact portions;

and control circuitry configured to control a supply of power from the power supply to the electrical contact portions.

In one embodiment, the atomizer mount is formed from a molded polymeric material that is molded around the atomizer assembly.

BRIEF DESCRIPTION OF THE DRAWINGS

Features described in relation to one example embodiment may equally be applied to other example embodiments.

Example embodiments will now be described with reference to the following drawings.

DETAILED DESCRIPTION

Figure 1:
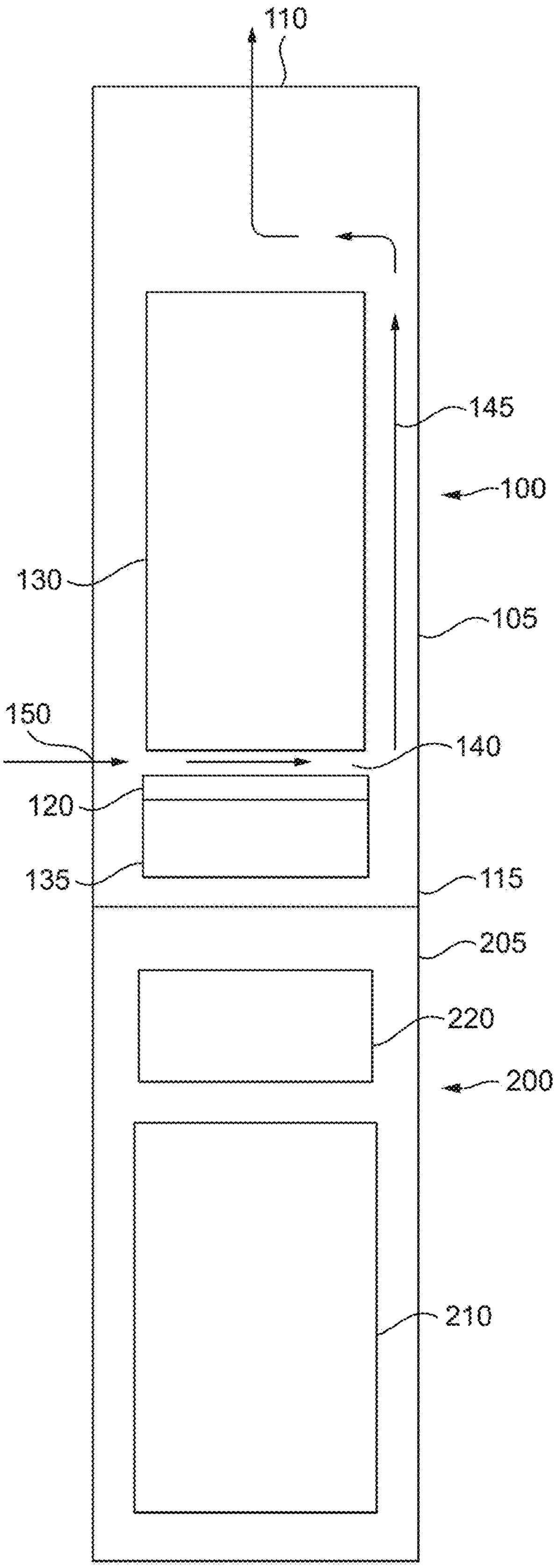
FIG. 1 illustrates an aerosol-generating system, in accordance with an example embodiment.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises,” “comprising,” “includes,” and/or “including,” when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, regions, layers and/or sections, these elements and/or sections should not be limited by these terms. These terms are only used to distinguish one element or section from another section. Thus, a first element, or section discussed below could be termed a second element, or section without departing from the teachings set forth herein.

Spatially relative terms, such as “beneath”, “below”, “lower”, “above”, “upper”, and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

General Methodology

Problems can arise when liquid or vapor in the airflow path come into contact with electrical contacts. The vapor or liquid can, over time, damage the electrical contacts, affecting the operation of the system.

The example embodiments provide an arrangement for an aerosol-generating system in which the electrical contacts of a vaporizer are protected from liquid and vapor within the system. The arrangement is simple, robust and inexpensive to produce.

Specific Example Embodiments

In a first aspect of the example embodiments, there is provided a cartridge for an aerosol-generating system (also referred to as a “vapor-generating system,” or vaporizer), the cartridge including an air inlet, and air outlet and an airflow path from the air inlet to the air outlet; an atomizer assembly including a fluid permeable aerosol-generating element and two electrical contact portions (also referred to as a “electrical contacts”) connected to the aerosol-generating element, the atomizer assembly having a first side and a second side opposite the first side, wherein a first side of the aerosol-generating element is exposed to the airflow path and a second side of the aerosol-generating element is in contact with a liquid aerosol-forming substrate (also referred to as a “pre-vapor formulation”) in the cartridge; and an atomizer mount molded around the atomizer assembly, the atomizer mount covering a portion of the first side of the atomizer assembly to isolate the electrical contact portions from the airflow path and covering at least a portion of the second side of the atomizer assembly to isolate the electrical contact portions from the liquid aerosol-forming substrate.

A cartridge constructed in this way provides for a simple an inexpensive way to secure a fluid permeable atomizer assembly, such as a heater assembly, while protecting the electrical contacts from liquid and vapor within the cartridge. The atomizer mount is molded as a single piece.

The fluid permeable aerosol-generating element may include a plurality of interstices or apertures (where the interstices and/or apertures are referred to as a "fluid passage" in the aerosol-generating element) extending from the second side to the first side and through which fluid may pass. The fluid permeable aerosol-generating element may be substantially planar.

The fluid permeable aerosol-generating element may be a heating element. Alternatively, the aerosol-generating element may be a vibrating element.

The heating element may include a substantially flat heating element to allow for simple manufacture. Geometrically, the term "substantially flat" heating element is used to refer to a heating element that is in the form of a substantially two-dimensional topological manifold. Thus, the substantially flat heating element extends in two dimensions along a surface substantially more than in a third dimension. In particular, the dimensions of the substantially flat heating element in the two dimensions within the surface is at least five times larger than in the third dimension, normal to the surface. An example of a substantially flat heating element is a structure between two substantially imaginary parallel surfaces, wherein the distance between these two imaginary surfaces is substantially smaller than the extension within the surfaces. In an embodiment, the substantially flat heating element is planar. In another embodiment, the substantially flat heating element is curved along one or more dimensions, for example forming a dome shape or bridge shape.

The heating element may include a plurality of interstices or apertures extending from the second side to the first side and through which fluid may pass.

The heating element may include a plurality of electrically conductive filaments. The term "filament" is used throughout the specification to refer to an electrical path arranged between two electrical contacts. A filament may branch off and diverge into several paths or filaments, respectively, or may converge from several electrical paths into one path. A filament may have a round, square, flat or any other form of cross-section. A filament may be arranged in a straight or curved manner.

The heating element may be an array of filaments, for example arranged parallel to each other. In an embodiment, the filaments may form a mesh. The mesh may be woven or non-woven. The mesh may be formed using different types of weave or lattice structures. In another example embodiment, the electrically conductive heating element consists of an array of filaments or a fabric of filaments. The mesh, array or fabric of electrically conductive filaments may also be characterized by its ability to retain liquid.

In an example embodiment, a substantially flat heating element may be constructed from a wire that is formed into a wire mesh. In another example embodiment, the mesh has a plain weave design. In another example embodiment, the heating element is a wire grill made from a mesh strip.

The electrically conductive filaments may define interstices between the filaments and the interstices that may have a width of between 10 micrometres and 100 micrometres. In an embodiment, the filaments give rise to capillary action in the interstices, so that in operation, liquid to be vaporized is drawn into the interstices, increasing the contact area between the heating element and the liquid aerosol-forming substrate.

The electrically conductive filaments may form a mesh of size between 60 and 240 filaments per centimetre (+/−10 percent). In an embodiment, the mesh density is between 100 and 140 filaments per centimetres (+/−10 percent), or in another embodiment the mesh density is approximately 115 filaments per centimetre. The width of the interstices may be between 100 micrometres and 25 micrometres, or between 80 micrometres and 70 micrometres, or approximately 74 micrometres. The percentage of open area of the mesh, which is the ratio of the area of the interstices to the total area of the mesh may be between 40 percent and 90 percent, or between 85 percent and 80 percent, or approximately 82 percent.

The electrically conductive filaments may have a diameter of between 8 micrometres and 100 micrometres, or between 10 micrometres and 50 micrometres, or between 12 micrometres and 25 micrometres, or approximately 16 micrometres. The filaments may have a round cross-section or may have a flattened cross-section.

The area of the mesh, array or fabric of electrically conductive filaments may be small, for example less than or equal to 50 square millimetres, or less than or equal to 25 square millimetres, or approximately 15 square millimetres. The size is chosen such to incorporate the heating element into a handheld system. Sizing of the mesh, array or fabric of electrically conductive filaments less or equal than 50 square millimetres reduces the amount of total power required to heat the mesh, array or fabric of electrically conductive filaments while still ensuring sufficient contact of the mesh, array or fabric of electrically conductive filaments to the liquid aerosol-forming substrate. The mesh, array or fabric of electrically conductive filaments may, for example, be rectangular and have a length between 2 millimetres to 10 millimetres and a width between 2 millimetres and 10 millimetres. In an embodiment, the mesh has dimensions of approximately 5 millimetres by 3 millimetres.

The filaments of the heating element may be formed from any material with suitable electrical properties. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may include doped or undoped ceramics. Examples of suitable doped ceramics include doped silicon carbides. Examples of suitable metals include titanium, zirconium, tantalum and metals from the platinum group.

Examples of suitable metal alloys include stainless steel, constantan, nickel-, cobalt-, chromium-, aluminum-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal® (alpha/beta titanium alloy), iron-aluminum based alloys and iron-manganese-aluminum based alloys. Timetal® is a registered trade mark of Titanium Metals Corporation. The filaments may be coated with one or more insulators. Example materials for the electrically conductive filaments are stainless steel and graphite, or 300 series stainless steel like AISI 304, 316, 304L, 316L. Additionally, the electrically conductive heating element may include combinations of the above materials. A combination of materials may be used to improve the control of the resistance of the substantially flat heating element. For example, materials with a high intrinsic resistance may be combined with materials with a low intrinsic resistance. This may be advantageous if one of the materials is more beneficial from other perspectives, for example reasons that may include price, machinability or other physical and chemical parameters. A substantially flat filament arrangement with increased resistance reduces parasitic losses. High resistivity heaters allow more efficient use of battery energy.

In an example embodiment, the filaments are made of wire. In another example embodiment, the wire is made of metal, or stainless steel.

In an example embodiment, the electrical resistance of the mesh, array or fabric of electrically conductive filaments of the heating element may be between 0.3 Ohms and 4 Ohms. In another embodiment, the electrical resistance is equal or greater than 0.5 Ohms. In another embodiment, the electrical resistance of the mesh, array or fabric of electrically conductive filaments is between 0.6 Ohms and 0.8 Ohms, or about 0.68 Ohms. The electrical resistivity of the mesh, array or fabric of electrically conductive filaments may be at least an order of magnitude, or at least two orders of magnitude, greater than the electrical resistivity of electrically conductive contact portions. This ensures that the heat generated by passing current through the heating element is localized to the mesh or array of electrically conductive filaments. It is advantageous to have a low overall resistance for the heating element if the system is powered by a battery. A low resistance, high current system allows for the delivery of high power to the heating element. This allows the heating element to heat the electrically conductive filaments to a desired temperature quickly.

In an alternative embodiment, the heating element may include a heating plate in which an array of apertures is formed. The apertures may be formed by etching or machining, for example. The plate may be formed from any material with suitable electrical properties, such as the materials described above in relation to filaments of a heating element.

Advantageously, the electrical contact portions are positioned on opposite ends of heating element. The electrical contact portions may be two electrically conductive contact pads. The electrically conductive contact pads may be positioned at an edge area of the heating element. In an example embodiment, the at least two electrically conductive contact pads may be positioned on extremities of the heating element. An electrically conductive contact pad may be fixed directly to electrically conductive filaments of the heating element. An electrically conductive contact pad may include a tin patch. Alternatively, an electrically conductive contact pad may be integral with the heating element.

In an example embodiment, the atomizer mount completely covers the electrical contact portions on the first side of the atomizer assembly. The electrical contact portions may be exposed on the second side of the atomizer assembly to allow for electrical contact with a power supply.

The cartridge may include a liquid storage compartment. Liquid aerosol-forming substrate is held in the liquid storage compartment. The liquid storage compartment may have first and second portions in communication with one another. The atomizer mount may include at least one wall defining a second portion of the liquid storage compartment, the wall extending from the second side of the atomizer assembly.

A first portion of the liquid storage compartment may be on an opposite side of the atomizer assembly to the second portion of the liquid storage compartment. Liquid aerosol-forming substrate is held in the first portion of the liquid storage compartment. The first portion of the liquid storage compartment may be defined, at least partially, by the atomizer mount.

In an example embodiment, the first portion of the storage compartment is larger than the second portion of the storage compartment. In an embodiment, a mouth end opening of the cartridge may be positioned above the aerosol-generating element, with the first portion of the storage compartment positioned between the mouth end opening and the atomizer assembly. Having the first portion of the storage compartment larger than the second portion of the storage compartment ensures that liquid is delivered from the first portion of the storage compartment to the second portion of the storage compartment and the aerosol-generating element under the influence of gravity.

The cartridge may have a mouth end through which generated aerosol can be drawn and a connection end configured to connect to a control body of an aerosol-generating system, wherein the first side of the aerosol-generating element faces the mouth end and the second side of the aerosol-generating element faces the connection end.

In an example embodiment, the atomizer mount defines an enclosed liquid flow path from a first side of the atomizer assembly to the second side of the atomizer assembly, connecting the first and second portions of the liquid storage compartment. The atomizer mount may define two enclosed liquid flow paths from a first side of the atomizer assembly to the second side of the atomizer assembly. The two enclosed liquid flow paths may be disposed symmetrically about the aerosol-generating element.

The cartridge may define an enclosed airflow path from an air inlet, past the first side of the atomizer assembly, to a mouth end opening of the cartridge. The enclosed airflow path may pass through the first or second portion of the liquid storage compartment. In an example embodiment, the air flow path extends between the first and second portions of the liquid storage compartment. Additionally, the air flow passage may extend through the first portion of the liquid storage compartment. For example, the first portion of the liquid storage compartment may have an annular cross-section, with the air flow passage extending from the aerosol-generating element to the mouth end portion through the first portion of the liquid storage compartment. In an alternative embodiment, the air flow passage may extend from the aerosol-generating element to the mouth end opening adjacent to the first portion of the liquid storage compartment.

The cartridge may include a capillary material in contact with the second side of the aerosol-generating element. The capillary material delivers liquid aerosol-forming substrate to the aerosol-generating element against the force of gravity. By requiring the liquid aerosol forming substrate to travel against the force of gravity to reach the aerosol-generating element, the possibility of large droplets of the liquid entering the airflow passage is reduced.

The capillary material may be made of a material capable of guaranteeing that there is liquid aerosol-forming substrate in contact with at least a portion of the surface of the aerosol-generating element. The capillary material may extend into interstices or apertures in the aerosol-generating element. The aerosol-generating element may draw liquid aerosol-forming substrate into the interstices or apertures by capillary action.

A capillary material is a material that actively conveys liquid from one end of the material to another. The capillary material may have a fibrous or spongy structure. The capillary material may include a bundle of capillaries. For example, the capillary material may include a plurality of fibers or threads or other fine bore tubes. The fibers or threads may be generally aligned to convey liquid aerosol-forming substrate towards the heating element. Alternatively, the capillary material may include a sponge-like or foam-like material. The structure of the capillary material forms a plurality of small bores or tubes, through which the liquid aerosol-forming substrate can be transported by capillary action. The capillary material may include any suitable material or combination of materials. Examples of suitable materials are a sponge or foam material, ceramic- or graphite-based materials in the form of fibers or sintered powders, foamed metal or plastics material, a fibrous material, for example made of spun or extruded fibers, such as cellulose acetate, polyester, or bonded polyolefin, polyethylene, terylene or polypropylene fibers, nylon fibers or ceramic. The capillary material may have any suitable capillarity and porosity so as to be used with different liquid physical properties. The liquid aerosol-forming substrate has physical properties, including but not limited to viscosity, surface tension, density, thermal conductivity, boiling point and vapor pressure, which allow the liquid aerosol-forming substrate to be transported through the capillary medium by capillary action.

Alternatively, or in addition, the cartridge may contain a carrier material for holding a liquid aerosol-forming substrate. The carrier material may be in the first portion of the storage compartment, the second portion of the storage compartment or both the first and second portions of the storage compartment. The carrier material may be a foam, and a sponge that is a collection of fibers. The carrier material may be formed from a polymer or co-polymer. In an example embodiment, the carrier material is a spun polymer. The aerosol-forming substrate may be released into the carrier material. For example, the liquid aerosol-forming substrate may be provided in a capsule.

The atomizer mount may be formed from a molded polymeric material able to withstand high temperatures, such as polyetheretherketone (PEEK) or LCP (liquid crystal polymer).

In an example embodiment, the cartridge contains liquid aerosol-forming substrate. As used herein with reference to the example embodiment, an aerosol-forming substrate is a substrate capable of releasing volatile compounds that can form an aerosol (also referred to as a "vapor"). Volatile compounds may be released by heating the aerosol-forming substrate. Volatile compounds may be released by moving the aerosol-forming substrate through passages of a vibratable element.

The aerosol-forming substrate may be a liquid at room temperature. The aerosol-forming substrate may include both liquid and solid components. The liquid aerosol-forming substrate may include nicotine. The nicotine containing liquid aerosol-forming substrate may be a nicotine salt matrix. The liquid aerosol-forming substrate may include a plant-based material. The liquid aerosol-forming substrate may include tobacco. The liquid aerosol-forming substrate may include a tobacco-containing material containing volatile tobacco flavor compounds, which are released from the aerosol-forming substrate upon heating. The liquid aerosol-forming substrate may include homogenized tobacco material. The liquid aerosol-forming substrate may include a non-tobacco-containing material. The liquid aerosol-forming substrate may include a homogenized plant-based material.

The liquid aerosol-forming substrate may include one or more aerosol-formers (also referred to as a "vapor-formers"). An aerosol-former is any suitable known compound or mixture of compounds that facilitates formation of a dense and stable aerosol and that is substantially resistant to thermal degradation at the temperature of operation of the system. Examples of suitable aerosol formers include glycerine and propylene glycol. Suitable aerosol-formers are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. The liquid aerosol-forming substrate may include water, solvents, ethanol, plant extracts and natural or artificial flavors.

The liquid aerosol-forming substrate may include nicotine and at least one aerosol former. The aerosol former may be glycerine or propylene glycol. The aerosol former may include both glycerine and propylene glycol. The liquid aerosol-forming substrate may have a nicotine concentration of between about 0.5% and about 10%, for example about 2%.

The cartridge may include a housing. The atomizer mount may be fixed to the housing. The housing may be formed form a moldable plastics material, such as polypropylene (PP) or polyethylene terephthalate (PET). The housing may form a part or all of a wall of one or both portions of the storage compartment. The housing and storage compartment may be integrally formed. Alternatively, the storage compartment may be formed separately from the housing and assembled to fit in the housing.

The cartridge may include a removable mouthpiece through which aerosol may be drawn. The removable mouthpiece may cover the mouth end opening. Alternatively, the cartridge may be configured to allow aerosol to be drawn directly from the mouth end opening.

The cartridge may be refillable with the liquid aerosol-forming substrate. Alternatively, the cartridge may be designed to be discarded when the storage compartment becomes depleted of the liquid aerosol-forming substrate.

In a second aspect of the example embodiment, there is provided an aerosol-generating system including a cartridge according to any one of the preceding example embodiments and a control body connected to the cartridge, the control body configured to control a supply of electrical power to the aerosol-generating element.

The control body may include at least one electrical contact element configured to provide an electrical connection to the aerosol-generating element when the control body is connected to the cartridge. The electrical contact element may be elongated. The electrical contact element may be spring-loaded. The electrical contact element may contact an electrical contact pad in the cartridge.

The control body may include a connecting portion for engagement with the connection end of the cartridge. The control body may include a power supply.

The control body may include control circuitry configured to control a supply of power from the power supply to the aerosol-generating element.

The control circuitry may include a microcontroller. The microcontroller may be a programmable microcontroller. The control circuitry may include further electronic components. The control circuitry may be configured to regulate a supply of power to the aerosol-generating element. Power may be supplied to the aerosol-generating element continuously following activation of the system or may be supplied intermittently. The power may be supplied to the aerosol-generating element in the form of pulses of electrical current.

The control body may include a power supply arranged to supply an electrical current to at least one of the control system and the aerosol-generating element. The aerosol-generating element may include an independent power supply. The control body may include a first power supply arranged to supply power to the control circuitry and a second power supply configured to supply power to the aerosol-generating element.

The power supply may be a DC power supply. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy to allow for the continuous generation of aerosol for a period of around six minutes, or for a period that is a multiple of six minutes. In another example, the power supply may have sufficient capacity to allow for a determined number of discrete activations of the atomizer assembly.

The aerosol-generating system may be a handheld aerosol-generating system having a total length between about 30 mm and about 150 mm. The aerosol-generating system may have an external diameter between about 5 mm and about 30 mm.

Although the system of the example embodiments has been described as including a cartridge and a control body, it is possible to implement the system as a one-piece system. In a third aspect of the example embodiments, there is provided an aerosol-generating system including an air inlet, and air outlet and an airflow path from the air inlet to the air outlet, an atomizer assembly including an aerosol-generating element and two electrical contact portions connected to the aerosol-generating element, the atomizer assembly having a first side and a second side opposite the first side, wherein a first side of the aerosol-generating element is exposed to the airflow path and a second side of the aerosol-generating element is in contact with a liquid aerosol-forming substrate; an atomizer mount molded around, and containing, the atomizer assembly, the atomizer mount covering a portion of the first side of the atomizer assembly to isolate the electrical contact portions from the airflow path and covering at least a portion of the second side of the atomizer assembly to isolate the electrical contact portions from the liquid aerosol-forming substrate; a power supply connected to the electrical contact portions; and control circuitry configured to control a supply of power from the power supply to the electrical contact portions.

The aerosol-generating element may include any of the features of the aerosol-generating element described in relation to the first aspect of the example embodiments.

The storage compartment may include any of the features of the storage compartment described in relation to the first aspect of the example embodiments. The storage compartment may be refillable with liquid aerosol-forming substrate. Alternatively, the system may be designed to be discarded when the storage compartment becomes depleted of the liquid aerosol-forming substrate.

The aerosol-generating system may include a housing. The housing may be elongated. The housing may include any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle. The housing may include any of the features of the housing described in relation to the first aspect of the example embodiments.

The air flow passage may include any of the features of the air flow passage described in relation to the first aspect of the example embodiments. The power supply may include any of the features of the power supply described in relation to the first aspect of the example embodiments. The control circuitry may include any of the features of the control circuitry described in relation to the first aspect of the example embodiments.

The cartridge, control body or aerosol-generating system may include a puff detector in communication with the control circuitry. The puff detector may be configured to detect a draw of air through the airflow path.

The cartridge, control body or aerosol-generating system may include a temperature sensor in communication with the control circuitry. The cartridge, control body or aerosol-generating system may include an input, such as a switch or button. The input may enable the system to be turned on and off.

The cartridge, control body or aerosol-generating system may also include indication means for indicating the determined amount of liquid aerosol-forming substrate held in the liquid storage portion. The control circuitry may be configured to activate the indication means after a determination of the amount of liquid aerosol-forming substrate held in the liquid storage portion has been made.

The indication means may include one or more of lights, such as light emitting diodes (LEDs), a display, such as an LCD display and audible indication means, such as a loudspeaker or buzzer and vibrating means. The control circuitry may be configured to light one or more of the lights, display an amount on the display, emit sounds via the loudspeaker or buzzer and vibrate the vibrating means.

Features of one aspect of the example embodiments may be applied to the other aspects of the example embodiments.

Example Structural Embodiments

FIG. 1 is an illustration of an aerosol-generating system in accordance with an example embodiment. The system include two main components, a cartridge 100 and a control body 200. A connection end 115 of the cartridge 100 is removably connected to a corresponding connection end 205 of the control body 200. The control body contains a battery 210, which in this example is a rechargeable lithium ion battery, and control circuitry 220. The aerosol-generating device 10 is portable.

The cartridge 100 includes a housing 105 containing an atomizing assembly 120 (also referred to as a "vaporizing assembly," or vaporizer) and a liquid storage compartment having a first portion 130 and a second portion 135. A liquid aerosol-forming substrate is held in the liquid storage compartment. Although not illustrated in FIG. 1, the first portion 130 of the liquid storage compartment is connected to the second portion of the liquid storage compartment 135 so that liquid in the first portion can pass to the second portion. The atomizing assembly receives liquid from the second portion 135 of the liquid storage compartment. In this embodiment, the atomizing assembly is a generally planar, fluid permeable heater assembly.

An air flow passage 140, 145 extends through the cartridge from an air inlet 150 past the atomizing assembly 120 and from the atomizing assembly to a mouth end opening 110 in the housing 105.

The components of the cartridge are arranged so that the first portion 130 of the liquid storage compartment is between the atomizing assembly 120 and the mouth end opening 110, and the second portion 135 of the liquid storage compartment is positioned on an opposite side of the atomizing assembly to the mouth end opening. In other words, the atomizing assembly lies between the two portions of the liquid storage compartment and receives liquid from the second portion, where the first portion of liquid storage compartment is closer to the mouth end opening than the second portion of the liquid storage compartment. The air flow passage extends past the atomizing assembly and between the first and second portion of the liquid storage compartment.

In operation, air is drawn through the airflow passage from the air inlet, past the atomizing assembly, to the mouth end opening. The control circuitry controls the supply of electrical power from the battery 210 to the cartridge when the system is activated. This in turn controls the amount and properties of the vapor produced by the atomizing assembly. The control circuitry may include an airflow sensor and the control circuitry may supply electrical power to the atomizing assembly when a draw of air is detected by the airflow sensor, thereby activating the atomizing assembly and generating a vapor that is entrained in the air flow passing through the air flow passage 140. The vapor cools within the airflow in passage 145 to form an aerosol, which is then drawn from the mouth end opening 110.

In operation, the mouth end opening 110 may be the highest (most elevated) point of the device. The construction of the cartridge, and in particular the arrangement of the atomizing assembly between first and second portions 130, 135 of the liquid storage compartment, is advantageous because it exploits gravity to ensure that the liquid substrate is delivered to the atomizing assembly even as the liquid storage compartment is becoming depleted, but an oversupply of liquid to the atomizing assembly is avoided, where such an oversupply of liquid may otherwise lead to leakage of liquid into the air flow passage.

Figure 2A:
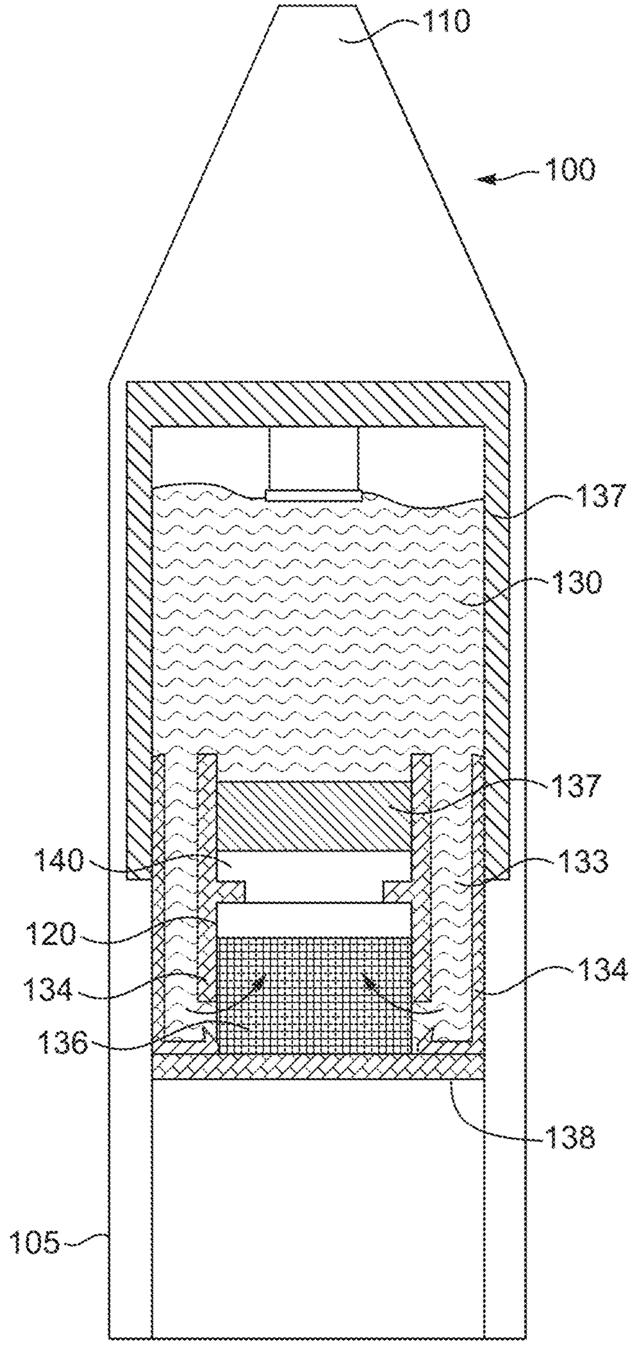
FIG. 2A illustrates a first cross-section of a cartridge, including a mouthpiece, in accordance with an example embodiment.
Figure 2B:
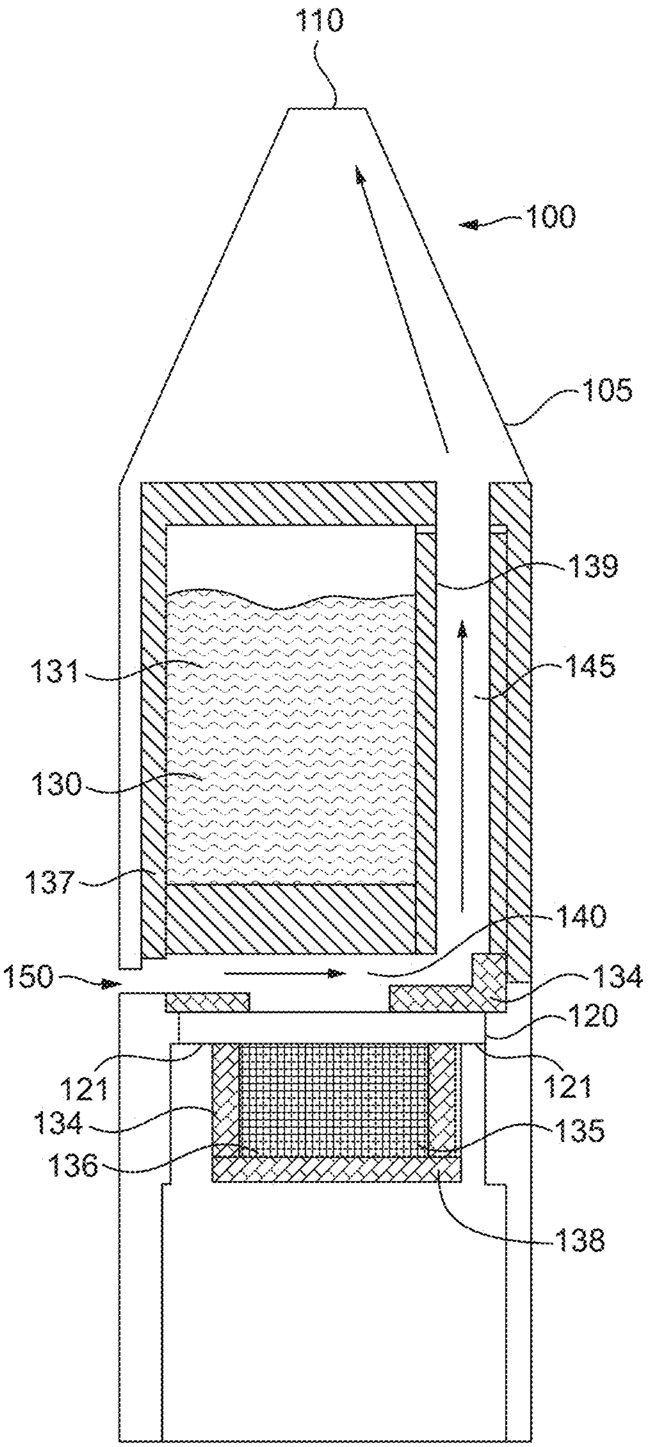
FIG. 2B illustrates a second cross-section of a cartridge, in accordance with an example embodiment.

FIG. 2A is a first cross-section of a cartridge in accordance with an example embodiment. FIG. 2B is a second cross-section, orthogonal to the cross-section of FIG. 2A.

The cartridge of FIG. 2A includes an external housing 105 having a mouth end with a mouth end opening 110, and a connection end opposite the mouth end. Within the housing is the liquid storage compartment holding a liquid aerosol-forming substrate 131. The liquid is contained in the liquid storage compartment by three components: an upper storage compartment housing 137, a heater (atomizer) mount 134 and an end cap 138. A heater assembly 120 is held in the heater mount 134. A capillary material 136 is provided in the second portion of the liquid storage compartment 135, and abuts the heater element in a central region of the heater assembly. The capillary material is oriented to transport liquid to the heater element. The heater element includes a mesh heater element, formed from a plurality of filaments. Details of this type of heater element construction can be found for example in the international published application number WO2015/117702, which is incorporated by reference in its entirety into this document. An airflow passage 140 extends between the first and second portions of the storage compartment. A bottom wall of the airflow passage includes the heater element 121 and the heater mount 134, side walls of the airflow passage include portions of the heater mount 134, and a top wall of the airflow passage includes a portion of the upper storage compartment housing 137. The air flow passage has a vertical portion 145 that extends through the first portion 130 of the liquid storage compartment, as shown in FIG. 2A, towards the mouth end opening 110.

The heater assembly 120 is generally planar and has two faces. A first face of the heater assembly 120 faces the first portion 130 of the liquid storage compartment and the mouth end opening 110. A second face of the heater assembly 120 is in contact with the capillary material 136 and the liquid 131 in the storage compartment, and faces a connection end 115 of the cartridge 100. The heater assembly 120 is closer to the connection end 115 so that electrical connection of the heater assembly 120 to a power supply 210 can be easily and robustly achieved, as will be described. The first portion 130 of the storage compartment is larger than the second portion 135 of the storage compartment and occupies a space between the heater assembly 120 and the mouth end opening 110 of the cartridge 100. Liquid in the first portion 130 of the storage compartment can travel to the second portion 135 of the storage compartment through liquid channels 133 on either side of the heater assembly 120. Two channels are provided in this example embodiment to provide a symmetric structure, although only one channel is necessary. The channels are enclosed liquid flow paths defined between the upper storage compartment housing 137 and the heater mount 134.

Figure 3:
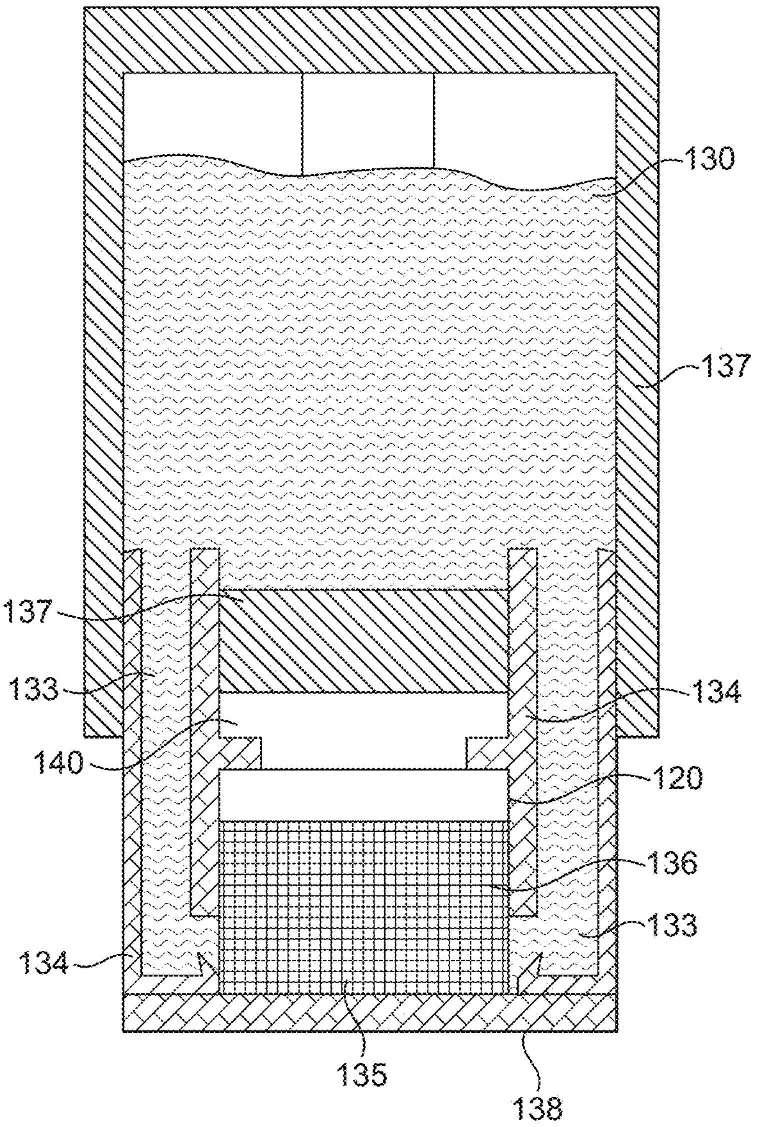
FIG. 3 illustrates a cartridge without a mouthpiece, in accordance with an example embodiment.

FIG. 3 is an illustration of enlarged view of the liquid storage compartment and heater assembly 120 of the cartridge 100 shown in FIGS. 2A and 2B, in accordance with an example embodiment. In an embodiment, the cartridge 100 may include the components shown in FIG. 3, without an external housing 105 or mouthpiece. The mouthpiece may be provided as a separate component to the cartridge 100, or may be provided as part of the control body 200, with the cartridge of FIG. 3 being configured to be inserted into the control body 200.

Figure 6A:
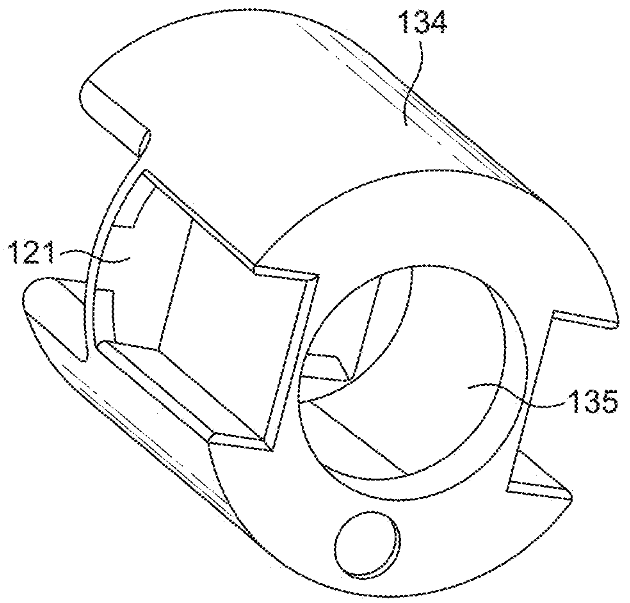
FIG. 6A illustrates a bottom view of the heater assembly and heater mount of FIG. 4A, in accordance with an example embodiment.
Figure 6B:
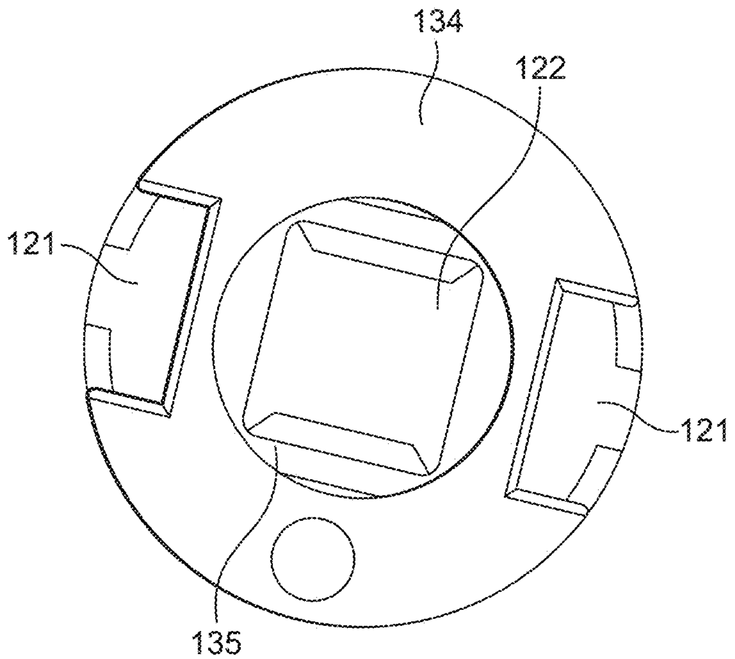
FIG. 6B illustrates a bottom view of the heater assembly and heater mount of FIG. 4B, in accordance with an example embodiment.

The cartridge of FIG. 3 may be assembled by first molding the heater mount 134 around the heater assembly 120. The heater assembly includes a mesh heater element 122 as described, fixed to a pair of tin contact pads 121, which have a much lower electrical resistivity than the heater element 122. The contact pads 121 are fixed to opposite ends of the heater element 122, as illustrated in FIGS. 6A and 6B. The heater mount 134 may then be fixed to the upper storage compartment housing 137, for example using a mechanical fitting, such as a snap fitting, or via other means such as welding or an adhesive. The capillary material 136 is inserted into the second portion 135 of the liquid storage compartment. The end cap 138 is then fixed to the heater mount 134 to seal the storage compartment.

Figure 4A:
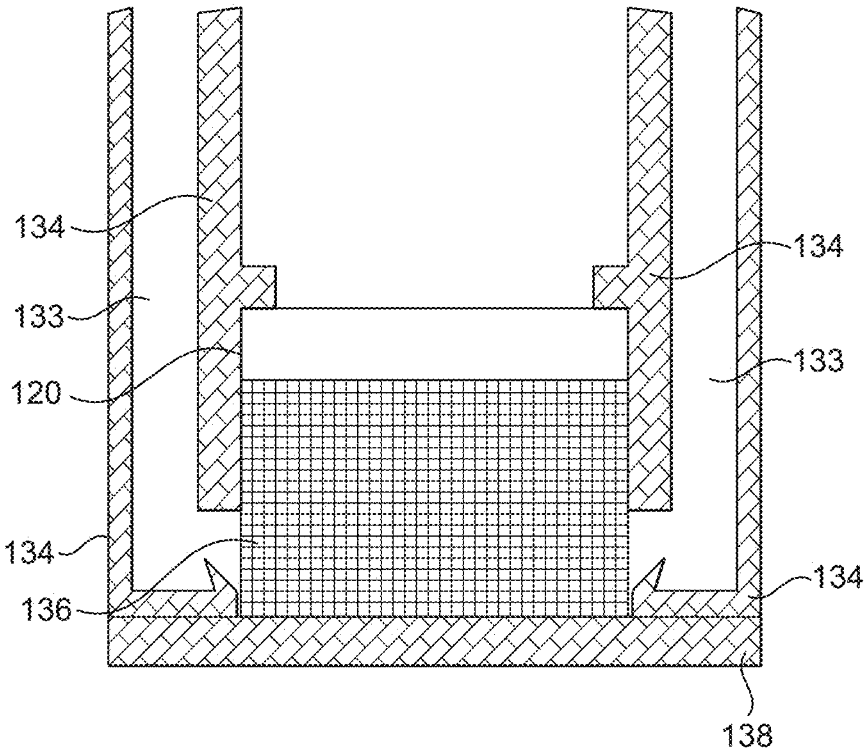
FIG. 4A illustrate the heater mount of FIG. 2A and FIG. 3, in accordance with an example embodiment.
Figure 4B:
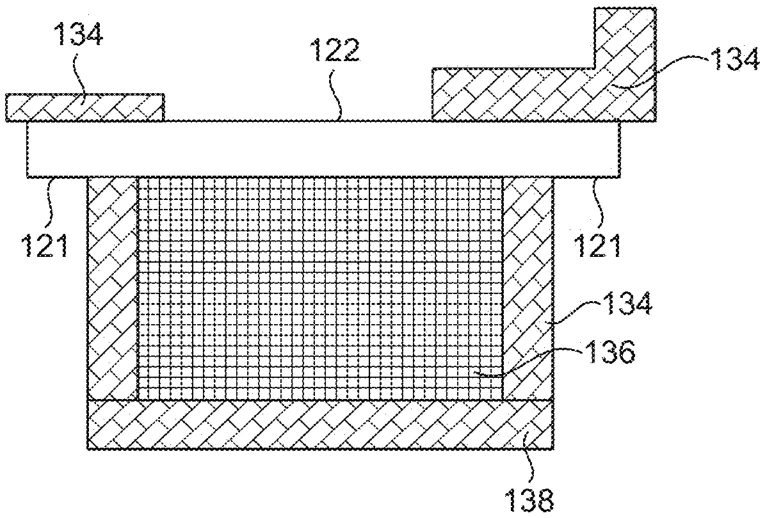
FIG. 4B illustrate the heater mount of FIG. 2B and FIG. 3, in accordance with an example embodiment.

In an alternative embodiment, the heater mount 134, the capillary material 136 and the end cap 138 can be assembled first before being fixed to the upper storage compartment housing 137. FIG. 4A is a first cross-section of the heater assembly 120, the heater mount 134, the capillary material 136 and the end cap 138, and the liquid channels 133. FIG. 4B is a second cross-section of the heater assembly 120, the heater mount 134, the capillary material 136, and the end cap 138. The heater mount 134 secures the heater assembly 120 on both sides of the heater assembly 120. The contact pads 121 are easily accessible from the second side of the heater assembly 120, but are covered by the heater mount 134 on the first side of the heater assembly 120 to protect them from vapor in the air flow passage 140. A lower wall of the heater mount 134 extends from the second side of the heater assembly 120 and isolates the contact pads 121 from the liquid in the second portion 135 of the liquid storage compartment.

Figure 5A:
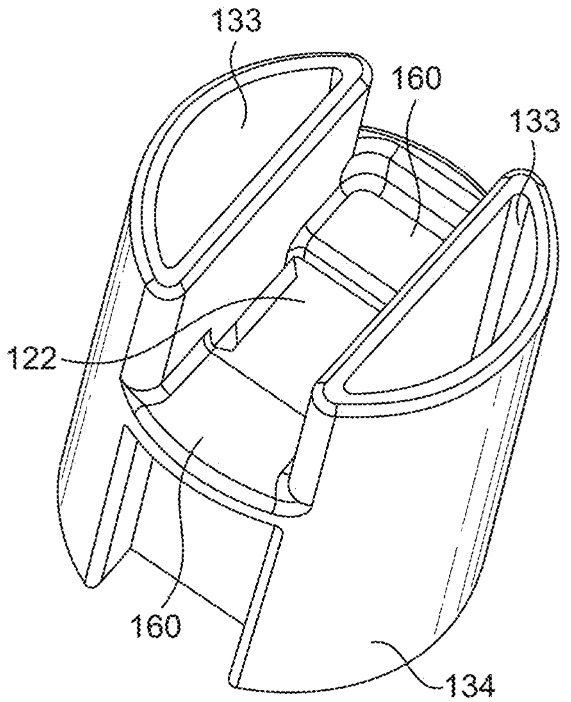
FIG. 5A illustrates a top perspective view of the heater assembly and heater mount of FIG. 4A, in accordance with an example embodiment.
Figure 5B:
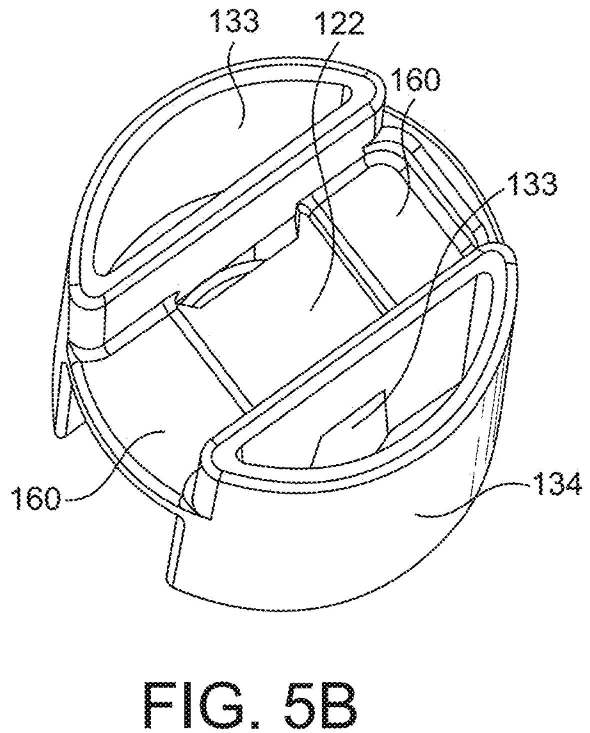
FIG. 5B illustrates a top perspective view of the heater assembly and heater mount of FIG. 4B, in accordance with an example embodiment.

The heater mount and heater assembly are shown in more detail in FIGS. 5A, 5B, 6A and 6B, in accordance with an example embodiment. In particular, FIGS. 5A and 5B illustrate top perspective views of the heater assembly 120 and heater mount 134 shown in FIGS. 4A and 4B. FIGS. 6A and 6B illustrate bottom views of the heater assembly 120 and heater mount 134 of FIGS. 4A and 4B. The end cap 138 and capillary material 136 are removed.

FIGS. 5A and 5B illustrate covering surfaces 160 of the heater mount 134 that cover the first side of the contacts pads 121 of the heater assembly 120, while the mesh heater element 122 is exposed. Liquid channels 133 from the first portion 130 of the storage compartment to the second portion 135 of the storage compartment are defined by vertical walls of the heater mount 134. The same walls also bound the airflow passage 140 as it passes over the heater element 120.

The heater mount is injection molded and formed from an engineering polymer, such as polyetheretherketone (PEEK) or LCP (liquid crystal polymer).

FIGS. 6A and 6B illustrate how the heater mount 134 isolates the contact pads 121 from the second portion 135 of the storage compartment, but allow the contact pads 121 to be accessible, in accordance with an example embodiment. A wall of the heater mount 134 isolates the contact portions 121 from the liquid in the storage compartment. The heater mount 134 also isolates the exposed portion of the contact pads 121 from the air flow passage 140.

The overmolding of the heater mount 134 on the heater assembly 120 provides a robust component that can be easily handled during assembly of the system without damaging delicate portions of the heater element 120.

The liquid may be inserted into the storage compartment from the bottom end, before the end cap 138 is fixed, or through a filling port (not shown) in the upper storage compartment housing 137, after the end cap 138 is fixed. The storage compartment may be refillable through a filling port.

The storage compartment may then be fixed inside a cartridge housing 105 using a mechanical fixing or using another means, such as an adhesive or welding, for example. Alternatively, the storage compartment may be fixed to or removably coupled to the housing of a control body of an aerosol-generating system.

Figure 7:
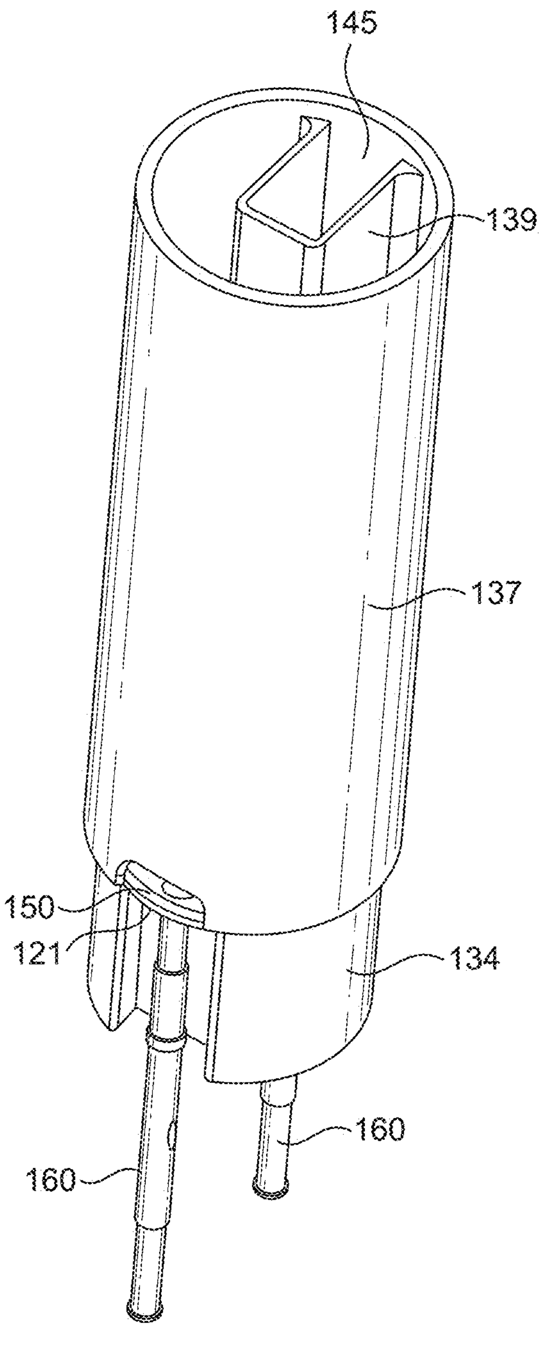
FIG. 7 illustrates the electrical connection of a control body to the heater assembly, in accordance with an example embodiment.

FIG. 7 illustrates how electrical contacts in a control body of an aerosol-generating system can be arranged to mate with the exposed contact pads 121 of the heater assembly 120, in accordance with an example embodiment. Only the electrical contacts of the control body are shown. The electrical contacts include a pair of spring loaded pins 160 that extend in the slots formed on either side of the heater mount 134 to contact the contact pads 121. With this arrangement, the cartridge can be inserted in or joined to the control body by moving the cartridge into contact with the pins in an insertion direction parallel to the longitudinal axis of the pins. When the pins are in contact with the contact pads 121, electrical current can be delivered to the heating element 122. The cartridge may be retained within a control body housing or may be fixed to the control body using a push fitting or snap fitting.

FIG. 7 also illustrates a cut-away portion of the upper storage compartment housing 137. It can be seen that an internal wall 139 is used to divide the airflow passage 145 from the liquid 131 within the storage compartment. The air inlet 150 is also clearly illustrated.

The operation of the system will now be briefly described. The system is first switched on using a switch on the control body 200 (not shown in FIG. 1). The system may include an airflow sensor in fluid communication with the airflow passage that may be puff (airflow) activated. This means that the control circuitry is configured to supply power to the heating element 122 based on signals from the airflow sensor. Alternatively, the supply of power to the heating element 122 may be based actuation of a switch. When power is supplied to the heating element 122, the heating element 122 heats to a temperature above a vaporization temperature of the liquid aerosol-forming substrate 131. The liquid aerosol-forming substrate flow to the heating element 122 is thereby vaporised and escapes into the airflow passage 140. The mixture of air drawn in through the air inlet 150 and the vapor from the heating element 122 is drawn through the airflow passage 140, 145 towards the mouth end opening 110. As it travels through the airflow passage 140, the vapor cools to form an aerosol, which is then drawn from the mouth end opening 110. At the end of a draw of air, or after a set time period, power to the heating element 122 is cut and the heater cools.

During normal operation of the device, the system is typically held so that the mouth end of the system is at an uppermost orientation (e.g., a highest elevation). This means that the first portion 130 of the liquid storage compartment is above the second portion 135 of the liquid storage compartment, and the heating element 122 is above the capillary material 136 in the second portion 135 of the liquid storage compartment. As liquid in the capillary material 136, close to the heating element 122, is vaporised and escapes into the airflow passage 140, it is replenished by liquid from the first portion 130 of the liquid storage compartment flowing into the capillary material 136, under the influence of gravity. The liquid from the first portion flows through the two enclosed liquid flow paths 133 into the capillary material 136. The capillary material 136 then draws the liquid up to the heating element 122. The direction of travel of the liquid is illustrated by the arrows in FIG. 2A.

Although the example embodiments have been described in relation to a system including a control body and a separate but connectable cartridge, it should be clear that the arrangement of the heater mount molded on the heater assembly, and the configuration of the liquid storage compartment, the airflow passage and the heater assembly could be used in a one-piece aerosol-generating system.

It should also be clear that alternative geometries are possible within the scope of the example embodiments. In particular, the airflow passage may extend through the first portion of the storage compartment in a different manner, such as through a center of the liquid storage compartment. The cartridge and liquid storage compartment may have a different cross-sectional shape and the heater assembly may have a different shape and configuration.

An aerosol-generating system having the construction described has several advantages. The possibility of liquid leaking into the air flow passage is mitigated by the arrangement of the first and second portions of the liquid storage compartment. The possibility of liquid or vapor damaging or corroding the electrical contact portions is significantly reduced by the construction of the heater mount. The construction is robust and inexpensive and results in minimal loss of the liquid aerosol-forming substrate.

The specific embodiments and examples described above illustrate but do not limit the example embodiments. It is to be understood that other embodiments may be made, and the specific embodiments and examples described herein are not exhaustive.

The invention claimed is:

1. A method, comprising:

defining a reservoir within at least one first housing, the reservoir having a first part and a second part and being configured to contain a pre-vapor formulation;

defining at least one channel that is configured to communicate the pre-vapor formulation from the first part to the second part;

defining an airflow path within the at least one first housing; and configuring a heater that is fluid permeable to heat and at least partially vaporize the pre-vapor formulation, the heater being on an end of the second part, the heater having a first surface that faces the first part, a first portion of the first surface being in direct communication with a second portion of the airflow path.

2. The method of claim 1, further comprising:

inserting a capillary material within the second part, the capillary material directly abutting the heater.

3. The method of claim 1, further comprising:

configuring a pair of electrical contacts to be in electrical contact with the heater.

4. The method of claim 3, further comprising:

defining a pair of slots on sides of a heater mount, the heater mount at least partially containing the second part, the pair of slots being configured to at least partially contain the pair of electrical contacts.

5. The method of claim 4, wherein the defining of the pair of slots at least partially defines the slots within a first wall and a second wall of the heater mount, the first wall defining an opening to expose the first portion of the first surface, the second wall being a sidewall of the heater mount that at least partially defines the second part, the first wall and the second wall being configured to respectively isolate the pair of electrical contacts from the second portion of the airflow path and the second part.

6. The method of claim 4, further comprising:

defining an opening in a first wall, the opening being configured to expose the first portion of the first surface to the second portion of the airflow path.

7. The method of claim 6, wherein the defining of the pair of slots at least partially defines the slots within the first wall and a second wall, the second wall is a sidewall that at least partially defines the second part, and surfaces of the first wall are perpendicular to the second wall.

8. The method of claim 1, further comprising:

defining a pair of slots on sides of a heater mount, the heater mount at least partially containing the second part;

defining an opening in a wall of the heater mount, the opening being configured to expose the first portion of the first surface to the second portion of the airflow path, the wall including first major surfaces that respectively face the pair of slots; and configuring contact pads on the first major surfaces, the contact pads being electrically connected to the heater and respectively connected to the pair of electrical contacts.

9. The method of claim 1, further comprising:

configuring contact pads on first major surfaces of a first wall, the contact pads being electrically connected to the heater.

10. The method of claim 9, further comprising:

defining an opening in the first wall, the opening being configured to expose the first portion of the first surface to the second portion of the airflow path.

11. The method of claim 10, further comprising:

defining a pair of slots, at least in part, with the first wall and a second wall, the second wall being a sidewall that at least partially defines the second part, the first wall and the second wall being configured to respectively isolate the contact pads from the second portion of the airflow path and the second part.

12. The method of claim 1, further comprising:

connecting a first housing to a second housing to form an assembly, the first housing containing the heater and at least partially defining the second part, the second housing defining the first part, the at least one first housing including the first housing and the second housing.

13. The method of claim 12, wherein the defining defines the at least one channel within the first housing, and the connecting includes sliding an end of the first housing into the second housing such that at least a portion of the at least one channel extends into the second housing.

14. The method of claim 13, further comprising:

inserting the assembly into an outer housing to form a cartridge.

15. The method of claim 14, further comprising:

connecting a control section to the cartridge to form a device; and defining an air inlet and an air outlet within the outer housing, the air inlet and the air outlet being in communication with the airflow path.

16. The method of claim 15, further comprising:

configuring control circuitry and a power supply within the control section to be operatively connected to the heater in order to selectively send an electrical current to the heater when the control section is connected to the cartridge and the device is in operational use.

17. The method of claim 12, wherein the defining defines the airflow path, at least in part, within the first housing and the second housing, the airflow path being defined when the first housing and the second housing are connected together.

18. The method of claim 1, wherein the defining defines the at least one channel to be a first channel and a second channel on opposing sides of the heater.

19. The method of claim 1, wherein the configuring configures the heater to include a plurality of electrically conductive filaments forming at least one of a mesh or a perforated plate.

20. The method of claim 1, wherein the configuring configures the heater to be planar in shape, the first surface being flat.

* * * * *